(12) United States Patent
Komaji et al.

(10) Patent No.: US 11,235,813 B2
(45) Date of Patent: Feb. 1, 2022

(54) SIDE VEHICLE-BODY STRUCTURE OF VEHICLE

(71) Applicant: MAZDA MOTOR CORPORATION, Hiroshima (JP)

(72) Inventors: Tomohiro Komaji, Aki-gun (JP); Yoshihiko Horita, Aki-gun (JP)

(73) Assignee: MAZD.A MOTOR CORPORATION, Hiroshima (JP)

( * ) Notice: Subject to any disclaimer, the term of this patent is extended or adjusted under 35 U.S.C. 154(b) by 5 days.

(21) Appl. No.: 16/995,660

(22) Filed: Aug. 17, 2020

(65) Prior Publication Data
US 2021/0061360 A1    Mar. 4, 2021

(30) Foreign Application Priority Data

Aug. 26, 2019  (JP) .............................. JP2019-153787

(51) Int. Cl.
| | | |
|---|---|---|
| *B62D 25/04* | (2006.01) | |
| *B62D 21/15* | (2006.01) | |
| *B60J 5/04* | (2006.01) | |
| *B60R 22/24* | (2006.01) | |

(52) U.S. Cl.
CPC .............. *B62D 25/04* (2013.01); *B60J 5/043* (2013.01); *B60J 5/0451* (2013.01); *B60J 5/0479* (2013.01); *B60R 22/24* (2013.01); *B62D 21/157* (2013.01)

(58) Field of Classification Search
CPC ........ B62D 25/04; B62D 21/157; B60J 5/043; B60J 5/0479; B60J 5/0451
USPC ............................ 296/146.6, 193.06, 187.12
See application file for complete search history.

(56) References Cited

U.S. PATENT DOCUMENTS

| | | | |
|---|---|---|---|
| 2016/0083014 A1* | 3/2016 | Komamura | .......... B62D 21/152 |
| | | | 296/187.1 |
| 2020/0369326 A1* | 11/2020 | Honko | ................. B62D 25/025 |

FOREIGN PATENT DOCUMENTS

| | | | |
|---|---|---|---|
| JP | 2009120157 A | * | 6/2009 |
| JP | 2017226268 A | | 12/2017 |

* cited by examiner

*Primary Examiner* — Dennis H Pedder
(74) *Attorney, Agent, or Firm* — Studebaker & Brackett PC

(57) ABSTRACT

A side vehicle-body structure of a vehicle capable of efficiently absorbing side collision energy while downsizing an energy absorbing material. The side vehicle-body structure includes a center pillar in which a lower end side is positioned on a vehicle-width-direction outer side with respect to an upper end thereof. The center pillar includes a breakage inducing portion that is provided to be close to a lower portion of an outer wall of the center pillar and induces breakage at time of a side collision, and a step-down portion provided in a corner portion of a center pillar outer wall of the breakage inducing portion. An energy absorbing material is disposed between the step-down portion 3 and an inner panel.

11 Claims, 11 Drawing Sheets

SIDE VEHICLE-BODY STRUCTURE OF VEHICLE

BACKGROUND

Technical Field

The present disclosure relates to a side vehicle-body structure of a vehicle including a center pillar in which a lower end side is positioned on the vehicle-width-direction outer side with respect to an upper end thereof.

Background Art

In general, in a vehicle, a center pillar lower end side is positioned on the vehicle-width-direction outer side with respect to a center pillar upper end in a front view, and an up-down-direction intermediate portion of the center pillar behaves so as to intrude into the vehicle cabin when load is input to the center pillar intermediate portion at the time of a side collision. In order to prevent the above, a technology in which the center pillar is caused to have a vertical shape by temporarily breaking the center pillar lower portion side at the time of a side collision has been known.

Japanese Patent Laid-Open No. 2017-226268 discloses a structure in which a center pillar portion formed by an outer member and an inner member is provided and an opening serving as a breakage inducing portion that induces breakage at the time of a side collision is formed in a place close to a lower portion of the inner member in the center pillar portion. Further, an energy absorbing material is disposed on the inner member at a place directly above the opening. When the center pillar portion is broken at the time of a side collision, the side collision energy is actively absorbed by the energy absorbing material.

In the structure disclosed in Japanese Patent Laid-Open No. 2017-226268, the energy absorbing material is compactly disposed on the inner member of the center pillar portion. However, in this structure, the energy absorbing material does not absorb energy until the side collision progresses to a certain degree, and hence there has been room for improvement in this regard.

SUMMARY

Thus, the present disclosure provides a side vehicle-body structure of a vehicle capable of efficiently absorbing side collision energy while downsizing an energy absorbing material.

A side vehicle-body structure of a vehicle according to the present disclosure is a side vehicle-body structure including a center pillar in which a lower end side is positioned on a vehicle-width-direction outer side with respect to an upper end thereof. In the side vehicle-body structure, the center pillar includes a breakage inducing portion that is provided to be close to a lower portion of an outer wall of the center pillar and induces breakage at time of a side collision, and a step-down portion provided in a corner portion of a center pillar outer wall of the breakage inducing portion, and an energy absorbing material is disposed between the step-down portion and an inner panel.

The breakage inducing portion may be formed by an opening. According to the abovementioned configuration, by disposing the energy absorbing material on the stepped-down corner portion of the center pillar, the energy absorbing material can be downsized, and the side collision energy can be efficiently absorbed. When the side collision load is input to the step-down portion in the corner portion of the outer wall of the center pillar, the side collision load can be immediately transmitted to the energy absorbing material and the energy can be absorbed without a time lag.

In one embodiment of the present disclosure, a vehicle part is mounted on the center pillar and a reinforcement member is provided on a portion of the center pillar on which the vehicle part is mounted, and the energy absorbing material extending toward a vehicle outer side is integrally formed with the reinforcement member.

The vehicle part may be set to be a seat belt anchor. The reinforcement member may be set to be an anchor reinforcement. According to the abovementioned configuration, the reinforcement member can also serve as the energy absorbing material, and hence both of the reduction of the number of parts and the reduction of the assembling time can be performed.

In one embodiment of the present disclosure, the energy absorbing material is formed in a box-like shape. According to the abovementioned configuration, by forming the energy absorbing material in a box-like shape, the absorption amount of the side collision energy can be improved.

In one embodiment of the present disclosure, the vehicle is a clamshell door vehicle including a front door and a rear door in a form of a clamshell door structure, the center pillar is built in a front end portion of the rear door, the step-down portion is formed in the corner portion on a front side of the center pillar, and a rear end portion of the front door overlaps with an outer side of the step-down portion.

According to the abovementioned configuration, the following effect is obtained. In other words, in the doors in the form of a clamshell door structure, the step-down portions are formed in the front end of the rear door such that the front door and the rear door are flush when both of the doors are closed in a manner in which the rear end portion of the front door overlaps with the front end portion of the rear door. The energy absorbing material can be compactly disposed while using the structure as above in which the front door to the rear door are flush when the doors are closed. In other words, the energy absorbing material can be compactly disposed without forming a special door shape.

In one embodiment of the present disclosure, the energy absorbing material is formed in a half-box-like shape including a front wall portion along a front end of the rear door, a side wall portion along the step-down portion, and an upper wall portion connecting an upper end of the front wall portion and an upper end of the side wall portion to each other. According to the abovementioned configuration, the energy absorbing material includes the upper wall portion and the front wall portion to which the side collision load is easily input, and hence the efficiency of the side collision energy absorption can be improved.

According to the present disclosure, an effect in which the side collision energy can be efficiently absorbed while downsizing the energy absorbing material is obtained.

DETAILED DESCRIPTION

Efficiently absorbing side collision energy while downsizing an energy absorbing material is achieved by a configuration of a side vehicle-body structure of a vehicle. The side vehicle-body structure includes a center pillar in which a lower end side is positioned on a vehicle-width-direction outer side with respect to an upper end thereof, in which the center pillar includes a breakage inducing portion that is provided to be close to a lower portion of an outer wall of the center pillar and induces breakage at time of a side collision, and a step-down portion provided in a corner portion of the outer wall of the center pillar of the breakage inducing portion, and an energy absorbing material is disposed between the step-down portion and an inner panel.

Figure 1:
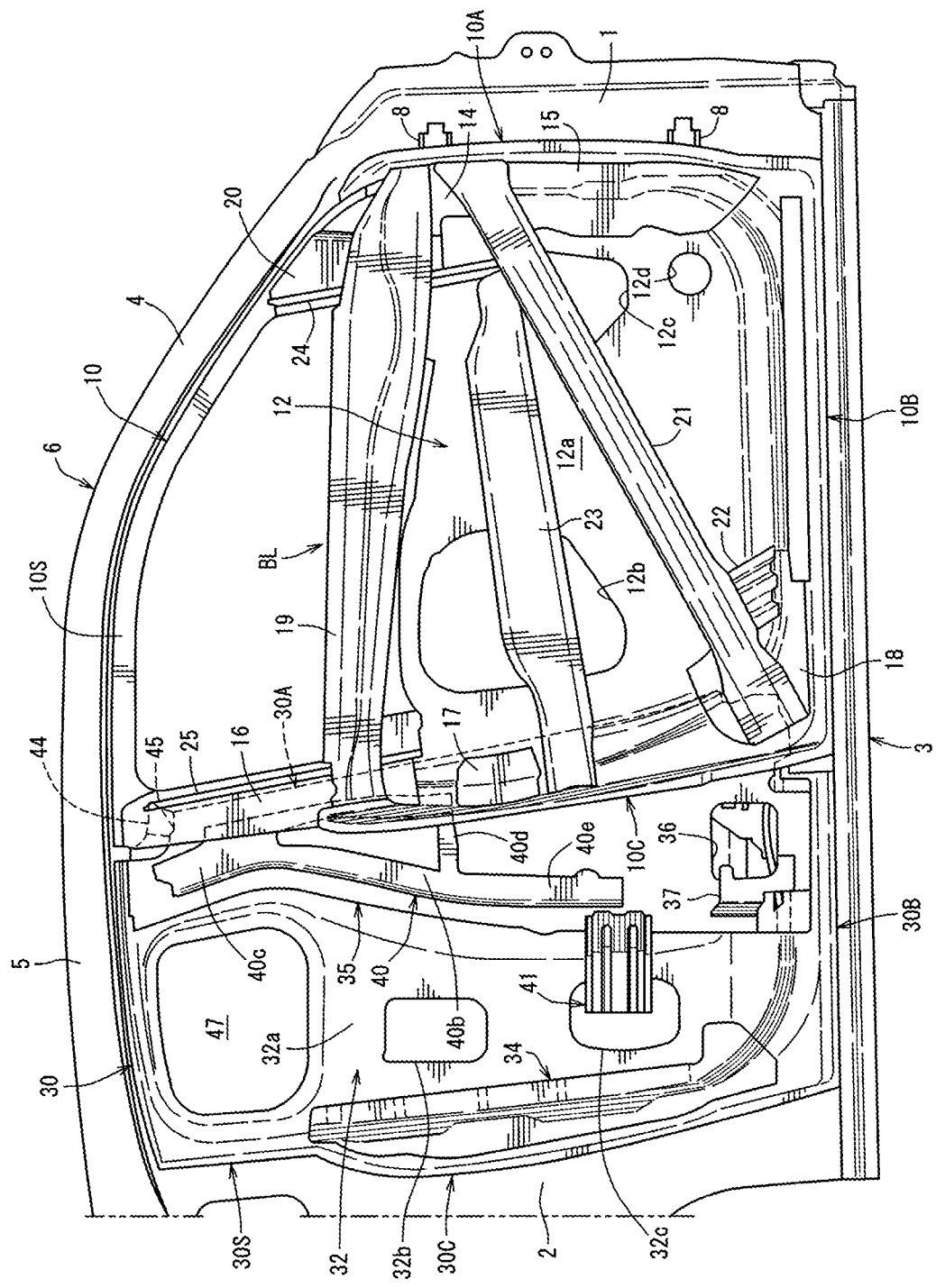
FIG. 1 is a side view illustrating a side vehicle-body structure of a vehicle of the present disclosure.
Figure 2:
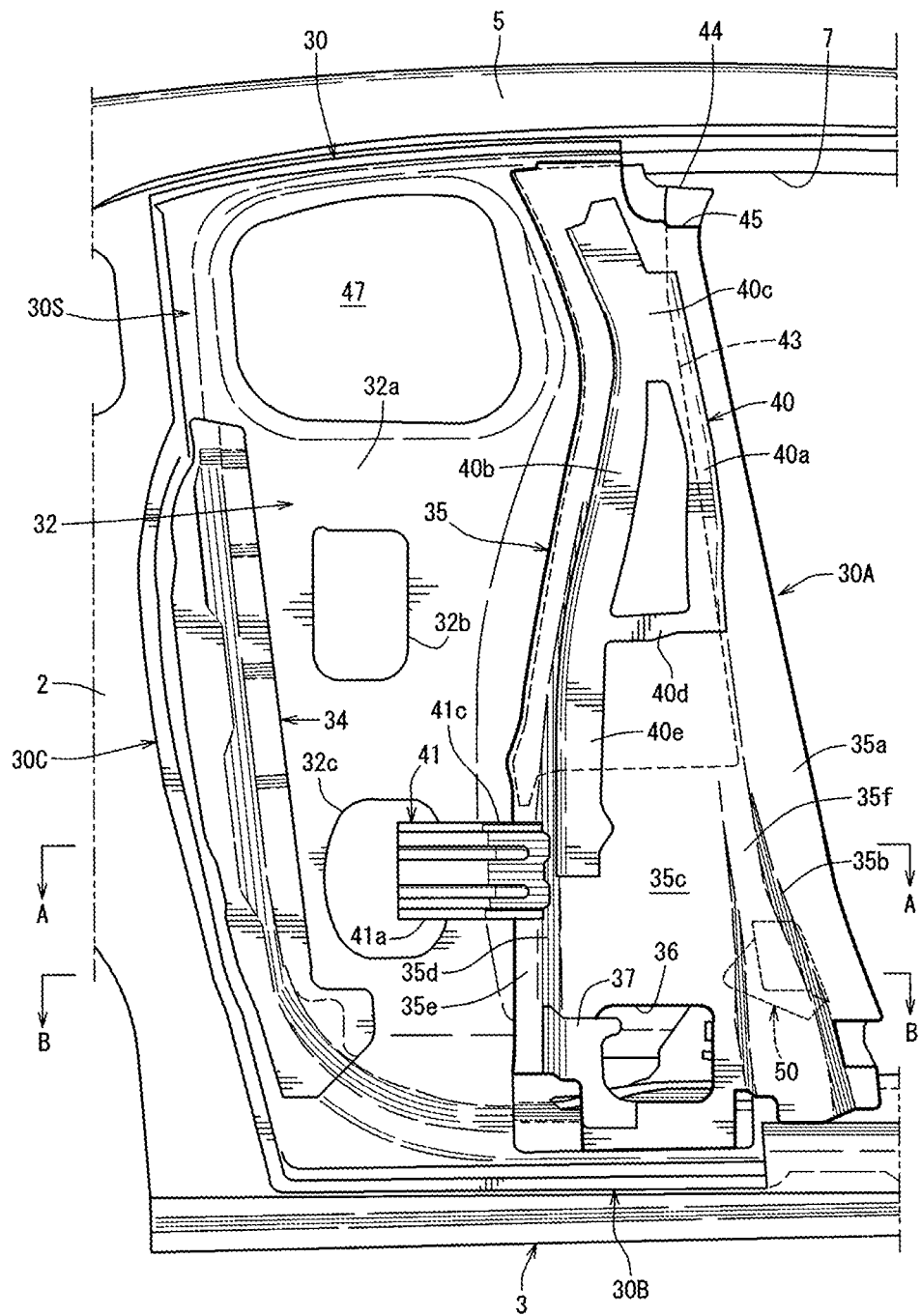
FIG. 2 is a main-part enlarged side view of FIG. 1.
Figure 3:
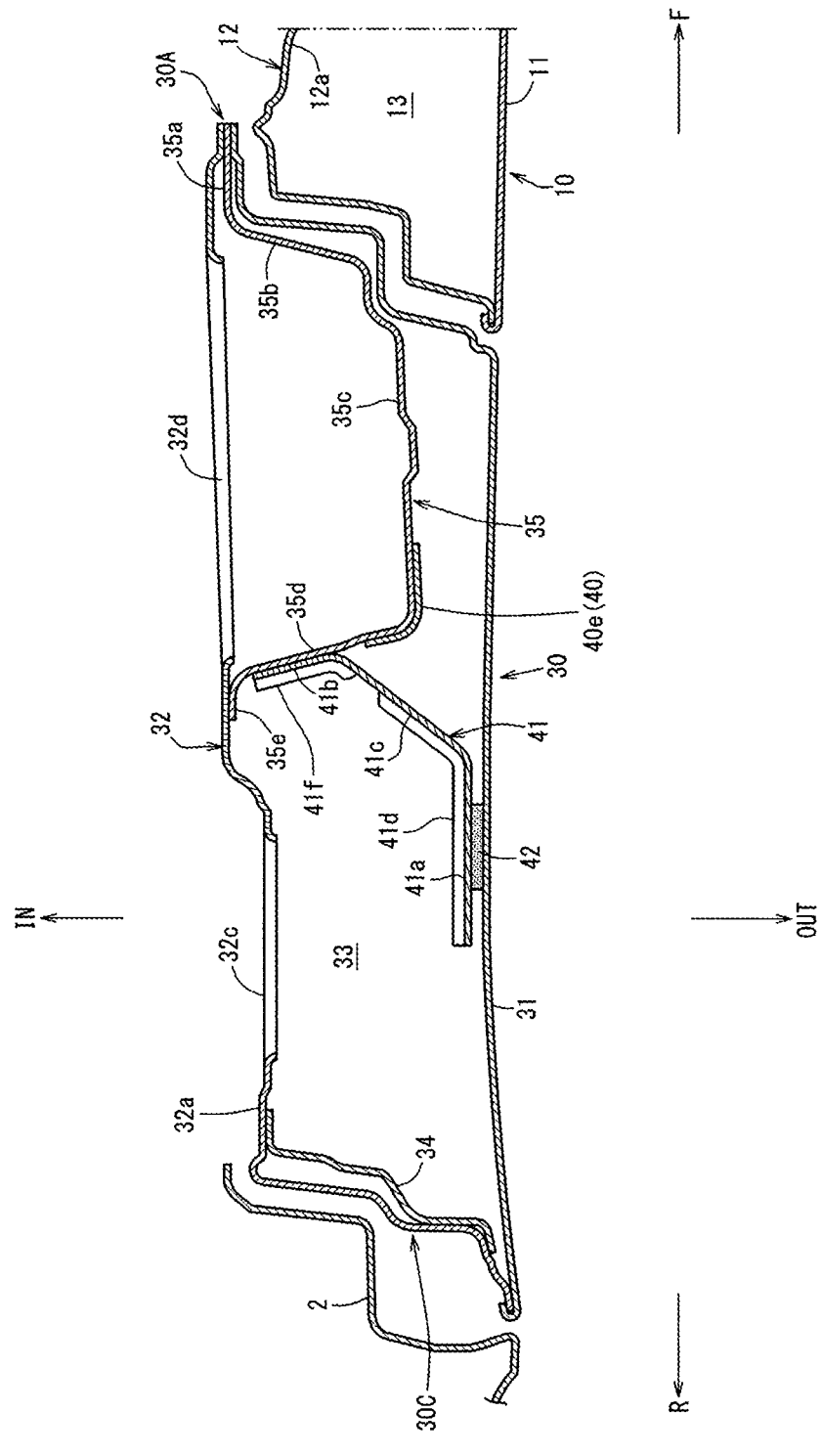
FIG. 3 is a cross-sectional arrow view taken along line A-A in FIG. 2.
Figure 4:
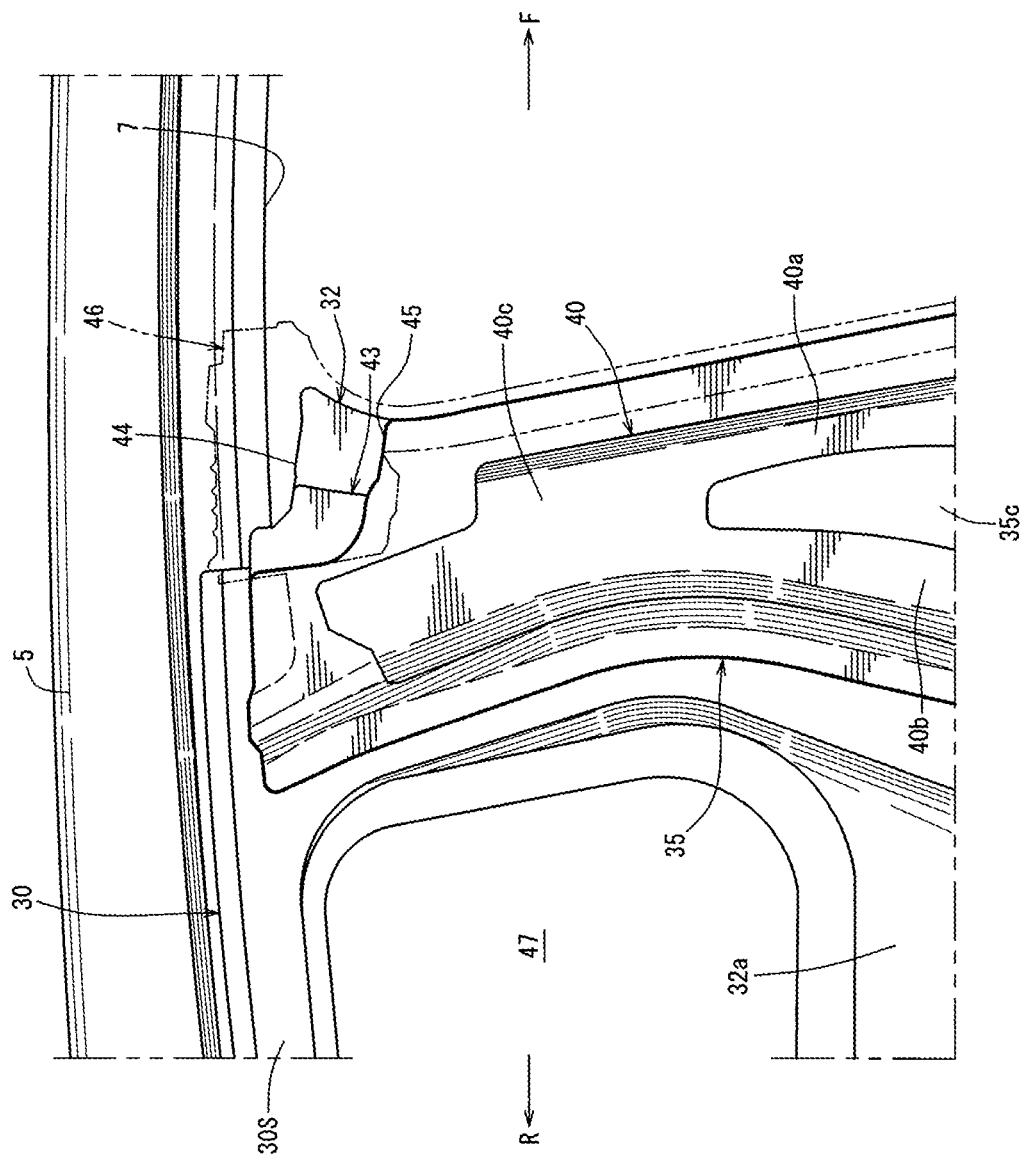
FIG. 4 is a partially-enlarged side view illustrating a structure of the periphery of an upper end portion of a door-side center pillar.
Figure 5:
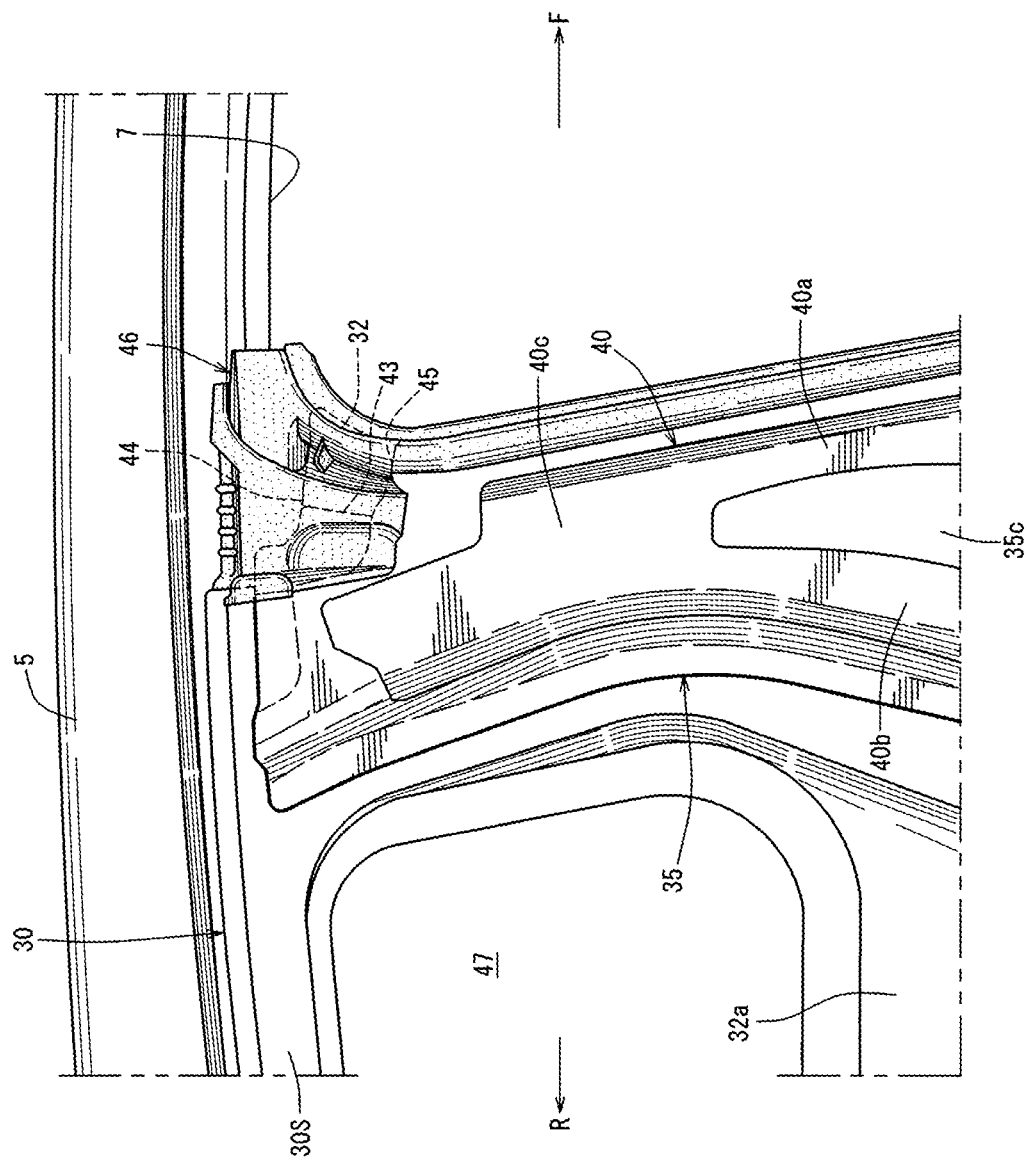
FIG. 5 is a partially-enlarged side view illustrating a state in which a die molding sealing member is mounted on a rear door front end portion.
Figure 6:
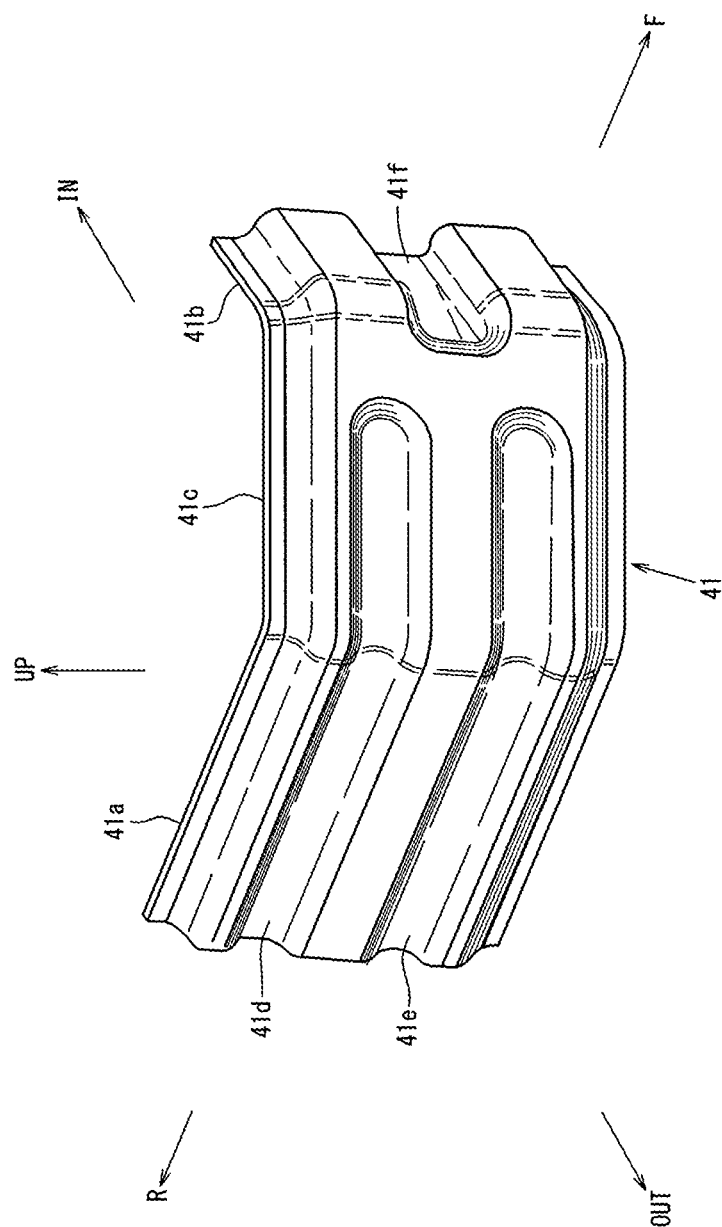
FIG. 6 is a perspective view illustrating a gusset member.

One embodiment of the present disclosure is described in detail with reference to the drawings below. The drawings illustrate a side vehicle-body structure of a vehicle. FIG. 1 is a side view illustrating the side vehicle-body structure of the vehicle in a state in which a door outer panel is removed and the side vehicle-body structure is seen from the vehicle-width-direction outer side, and FIG. 2 is a main-part enlarged side view of FIG. 1. FIG. 3 is a cross-sectional arrow view taken along line A-A in FIG. 2, FIG. 4 is a partially-enlarged side view illustrating a structure in the periphery of an upper end portion of a door-side center pillar, FIG. 5 is a partially-enlarged side view illustrating a state in which a die molding sealing member is mounted on a rear door front end portion, and FIG. 6 is a perspective view illustrating a gusset member.

As illustrated in FIG. 1, in a side portion on the body side, a hinge pillar portion 1 on the front side, a hinge pillar portion 2 on the rear side, a side sill portion 3, a front pillar portion 4, and a roof side rail portion 5 form an annular structure 6, and a center-pillar-less vehicle body in which a center pillar does not exist on the body side is formed. A door opening 7 (see FIG. 2) surrounded by the abovementioned portions, in other words, the hinge pillar portions 1 and 2, the side sill portion 3, the front pillar portion 4, and the roof side rail portion 5 is formed.

The hinge pillar portion 1 on the front side is a vehicle body rigid member having a hinge pillar closed cross-section extending in the vehicle up-down direction obtained by joining a hinge pillar outer and a hinge pillar inner to each other. The side sill portion 3 is a vehicle body rigid member connecting lower portions of the front and rear hinge pillar portions 1 and 2 to each other, and the side sill portion 3 has a side sill closed cross-section extending in the vehicle front-rear direction obtained by joining a side sill outer portion, a side sill inner portion, and a side sill reinforcement to each other.

The front pillar portion 4 is a vehicle body rigid member diagonally extending to the rear side and the upper side from a front portion to a rear portion thereof by connecting an upper end of the hinge pillar portion 1 on the front side and a front end of the roof side rail portion 5 to each other. The front pillar portion 4 has a diagonally-extending front pillar closed cross-section obtained by joining a front pillar outer and a front pillar inner to each other.

The roof side rail portion 5 is a vehicle body rigid member connecting a rear end of the front pillar portion 4 and a rear pillar portion front end (not shown) to each other in the vehicle front-rear direction. The roof side rail portion 5 has a roof side rail closed cross-section extending in the vehicle front-rear direction obtained by joining a roof side rail outer and a roof side rail inner to each other. As illustrated in FIG. 1 and FIG. 2, on the door opening 7 illustrated in FIG. 2, a front door 10 and a rear door 30 in the form of a clamshell door structure are provided.

The front door 10 is formed such that the rear side of the front door 10 opens and closes in a manner in which a door front end portion serves as a fulcrum via a pair of upper and lower hinge brackets 8, 8 provided on the hinge pillar portion 1. The rear door 30 is formed such that a front side of the rear door 30 opens and closes in a manner in which a door rear end portion serves as a fulcrum via a hinge bracket (not shown) provided on the hinge pillar portion 2 on the rear side. As illustrated in FIG. 3, the front door 10 and the rear door 30 in the form of a clamshell door structure are formed such that the front door 10 is opened in preference to the rear door 30.

As illustrated in FIG. 1 and FIG. 3, the front door 10 includes a door outer panel 11 made of a steel plate, and a door inner panel 12 made of a steel plate connected to the door outer panel 11 by a hemming process and the like, and a door panel is formed by both of the door outer panel 11 and the door inner panel 12.

The door outer panel 11 is disposed on the outside of the vehicle cabin to form a design surface of the front door 10. Meanwhile, the door inner panel 12 is disposed closer to the inside of the vehicle cabin than the door outer panel 11, and a door inner space 13 is formed between both of the door outer panel 11 and the door inner panel 12.

As illustrated in FIG. 1, the front door 10 includes a front edge portion 10A, a lower edge portion 10B, a rear edge portion 10C, a door sash portion 10S, and a beltline portion BL. At the front edge portion 10A, the door inner panel 12 is supported by the hinge pillar portion 1 on the vehicle body side in an openable and closable manner via the pair of upper and lower hinge brackets 8, 8.

At the front edge portion 10A of the front door 10, an upper hinge reinforcement 14 is provided on a place in the door inner panel 12 corresponding to the hinge bracket 8 on the upper side out of the pair of upper and lower hinge brackets 8, 8. Similarly, at the front edge portion 10A of the front door 10, a lower hinge reinforcement 15 is provided on a place in the door inner panel 12 corresponding to the hinge bracket 8 on the lower side out of the pair of upper and lower hinge brackets 8, 8.

As illustrated in FIG. 1, a reinforcement 16 extending in the up-down direction from the door inner panel 12 at the upper side of the rear edge portion 10C of the front door 10 to a rear piece portion of the door sash portion 10S is provided. A latch reinforcement 17 is provided in a place in the door inner panel 12 at an up-down-direction intermediate portion of the rear edge portion 10C. A connecting reinforcement member 18 is provided from a lower portion of the rear edge portion 10C to a rear portion of the lower edge portion 10B in the door inner panel 12. In addition, as illustrated in FIG. 1, a beltline reinforcement 19 extending in the front-rear direction is provided along the beltline portion BL.

The beltline reinforcement 19 is extended between the upper hinge reinforcement 14 of the front edge portion 10A and a lower portion of the reinforcement 16 at a rear piece portion of the door sash portion 10S. On the vehicle-width-direction inner side of the beltline reinforcement 19 and in a position corresponding to a door mirror (not shown) provided on the door outer panel 11, a bracket 20 also serving as a member for mounting the door mirror is provided.

As illustrated in FIG. 1, an impact bar 21 is mounted between the upper hinge reinforcement 14 positioned on the front side and the connecting reinforcement member 18 positioned on the rear side. The impact bar 21 is disposed so as to be inclined in a front-high rear-low shape such that a front portion is positioned on the upper side with respect to a rear portion in the up-down direction, and the impact bar 21 is for responding to a side collision.

As illustrated in FIG. 1, a reinforcement gusset member 22 connecting a rear portion of the impact bar 21 and the connecting reinforcement member 18 in the lower edge portion 10B of the front door 10 to each other is provided, and the reinforcement gusset member 22 is caused to function as a tension member.

As illustrated in FIG. 1, a stiffener 23 is provided that diagonally extends in the front-rear direction in a front-high rear-low shape, between a front portion of the beltline reinforcement 19 and a front portion of the impact bar 21, to the rear edge portion 10C directly below the latch reinforcement 17. The stiffener 23 is in abutment with the door outer panel 11 via a sponge member or a urethane material, and the tensile rigidity of the door outer panel 11 is secured by the stiffener 23.

As illustrated in the same drawing, glass guides 24 and 25 are mounted on both of the bracket 20 and the reinforcement 16. Window glass is guided to be raised and lowered along the pair of front and rear glass guides 24 and 25.

As illustrated in FIG. 1, the door inner panel 12 has a panel body 12a, and a plurality of openings 12b, 12c, and 12d for disposing a door module, a speaker, and the like are formed in the panel body 12a. Next, the structure of the rear door 30 is described with reference to FIG. 1, FIG. 2, and FIG. 3. As illustrated in FIG. 1, the length of the rear door 30 in the front-rear direction is formed to be shorter than the length of the front door 10 in the front-rear direction.

As illustrated in FIG. 3, the rear door 30 includes a door outer panel 31 made of a steel plate, and a door inner panel 32 made of a steel plate connected to the door outer panel 31 by a hemming process or spot welding, and both of the door outer panel 31 and the door inner panel 32 form a door panel.

The door outer panel 31 is disposed on the outside of the vehicle cabin to form a design surface of the rear door 30. Meanwhile, the door inner panel 32 is disposed closer to the inside of the vehicle cabin than the door outer panel 31, and a door inner space 33 is formed between both of the door outer panel 31 and the door inner panel 32.

As illustrated in FIG. 1 and FIG. 2, the rear door 30 includes a front edge portion 30A, a lower edge portion 30B, a rear edge portion 30C, and a window frame portion 30S. At the rear edge portion 30C, the door inner panel 32 is supported by the hinge pillar portion 2 on the vehicle body side in an openable and closable manner via a pair of upper and lower hinge brackets (not shown).

As illustrated in FIG. 2 and FIG. 3, at the rear edge portion 30C, a hinge reinforcement 34 extending in the up-down direction is provided in the door inner panel 32. As illustrated in FIG. 2 and FIG. 3, a center pillar 35 (the same meaning as a vertical reinforcement) on the door side is built in a front portion of the rear door 30 such that a front end thereof is along the front edge portion 30A. The center pillar 35 is a pillar member extending in the up-down direction from a front upper-end portion of the window frame portion 30S to the lower edge portion 30B.

As illustrated in FIG. 3 as a cross-sectional view, the center pillar 35 is formed to have a hat-shaped profile in a horizontal cross-section by integrally forming a joining flange portion 35a on the front side, a front wall portion 35b, an outer wall portion 35c, a rear wall portion 35d, and a joining flange portion 35e on the rear side.

As illustrated in FIG. 2, the center pillar 35 is formed such that the length on the upper portion side in the front-rear direction is shorter than the length on the lower portion side in the front-rear direction, but the center pillar 35 is formed to have a cross-sectional hat-shaped profile from the upper portion side to the lower portion side except for both of upper and lower end portions thereof. As illustrated in FIG. 3, the front and rear joining flange portions 35a and 35e of the center pillar 35 extend in the front-rear direction, and each of the joining flange portions 35a and 35e is joined and fixed to the door inner panel 32.

The front wall portion 35b extends from a rear end of the joining flange portion 35a to the vehicle-width-direction outer side. Similarly, the rear wall portion 35d extends from a front end of the joining flange portion 35e to the vehicle-width-direction outer side. The outer wall portion 35c extends between vehicle-width-direction outer ends of the front wall portion 35b and the rear wall portion 35d in the front-rear direction and connects the vehicle-width-direction outer ends to each other.

As illustrated in FIG. 2, an opening 36 is formed in the outer wall portion 35c of the center pillar 35 on the lower portion side thereof, and a reinforcement member 37 extending from the rear wall portion 35d to a rear rim portion of the opening 36 is provided in order to reinforce rigidity that decreases by forming the opening 36.

As illustrated in FIG. 2, a reinforcement member 40 that reinforces an upper portion of the center pillar 35 is provided on the upper portion side of the center pillar 35 in order to reinforce the upper portion side of the center pillar 35 of which length in the front-rear direction is relatively shorter than the length of the lower portion side thereof in the front-rear direction.

As illustrated in FIG. 2, the reinforcement member 40 includes a front edge portion 40a, a rear edge portion 40b spaced apart from the front edge portion 40a to the rear side, an upper portion connecting portion 40c extending upwards and connecting upper ends of the front edge portion 40a and the rear edge portion 40b to each other, and a lower portion connecting portion 40d extending in the front-rear direction and connecting lower ends of the front edge portion 40a and the rear edge portion 40b to each other. The reinforcement member 40 includes a downward extending portion 40e extending downward from a lower end of the rear edge portion 40b. The reinforcement member 40 is formed by integrally forming the components 40a to 40e.

The front edge portion 40a is formed to have an L-shaped cross-section and is joined to the front wall portion 35b and the outer wall portion 35c of the center pillar 35. The rear edge portion 40b is also formed to have an L-shaped cross-section and is joined to the rear wall portion 35d and the outer wall portion 35c of the center pillar 35. The upper portion connecting portion 40c is joined to at least the outer wall portion 35c of the center pillar 35. The lower portion connecting portion 40d is joined to the outer wall portion 35c of the center pillar 35. The downward extending portion 40e is formed to have an L-shaped cross-section and is joined to the rear wall portion 35d and the outer wall portion 35c of the center pillar 35.

Breakage is prevented by reinforcing an upper portion of the center pillar 35 of which width in the front-rear direction is short by the reinforcement member 40. By ending a lower end of the front edge portion 40a at the position of the lower portion connecting portion 40d, the rigidity is adjusted by both of the center pillar 35 and the reinforcement member 40. In other words, the proof stress against a side collision is adjusted. As illustrated in FIG. 2 and FIG. 3, a gusset member 41 serving as a load transmission member that protrudes to the door outer panel 31 side with respect to the outer wall portion 35c of the center pillar 35 from the rear wall portion 35d of the center pillar 35 is included.

As illustrated in FIG. 3 and FIG. 6, the gusset member 41 is obtained by integrally forming a receiving surface portion 41a for a side collision load along the door outer panel 31, a mounting portion 41b for the rear wall portion 35d of the center pillar 35, and a connecting portion 41c connecting both of the portions 41a and 41b to each other.

The gusset member 41 is disposed to be close to a lower portion of the center pillar 35, and a distal end side (a rear end side in this embodiment) of the gusset member 41 is set to be a free end. A urethane member 42 serving as an elastic member in abutment with the door outer panel 31 is provided on the receiving surface portion 41a of the gusset member 41.

By mounting the gusset member 41 having the receiving surface portion 41a for the side collision load on the rear wall portion 35d of the center pillar 35, the load is transmitted to the rear wall portion 35d of the center pillar 35 at the gusset member 41 at the time of a side collision. As a result, a behavior in which the front wall portion 35b of the center pillar 35 is greatly displaced to the vehicle-width-direction inner side with respect to the rear wall portion 35d due to the side collision load being slightly pressed against the front wall portion 35b of the center pillar 35 with respect to the rear wall portion 35d is suppressed.

In detail, the rear wall portion 35d of the center pillar 35 is pushed to the vehicle-width-direction inner side, and the rear wall portion 35d is dragged into the same direction via the mounting portion 41b of the gusset member 41 at the time of a side collision. As a result, the displacement of the front wall portion 35b to the vehicle-width-direction inner side is offset. In addition, a behavior in which the rear wall portion 35d of the center pillar 35 is displaced to the vehicle-width-direction inner side with respect to the front wall portion 35b is secured.

As illustrated in FIG. 6, a plurality of reinforcement beads 41d, 41e, and 41f are formed on the gusset member 41 along the extending direction of the gusset member 41. The reinforcement beads 41d and 41e out of the plurality of reinforcement beads 41d, 41e, and 41f protrude to the vehicle-width-direction inner side and are formed over the receiving surface portion 41a and the connecting portion 41c. The reinforcement bead 41f protrudes to the vehicle rear side and is formed over the entire length of the extending direction of the mounting portion 41b.

By the reinforcement beads 41d to 41f, the rigidity of the gusset member 41 in the extending direction thereof is increased. In addition, when load is transmitted to the rear wall portion 35d of the center pillar 35 via the gusset member 41 at the time of a side collision, the load transmission efficiency thereof is improved.

As illustrated in FIG. 2, regarding the relationship between the gusset member 41 and the reinforcement member 40, the downward extending portion 40e that is a rear end portion of the reinforcement member 40 extends downward to the position in which the gusset member 41 is disposed. As a result, the tension force against a lower portion of the rear door 30 by the gusset member 41 increases as the reinforcement member 40 is pushed to the indoor direction at the time of a side collision.

As illustrated in FIG. 2, a latch reinforcement 43 is provided on the front portion upper side of the door inner panel 32. The latch reinforcement 43 extends in the up-down direction from an upper end of the center pillar 35 to a portion directly above the gusset member 41 so as to correspond to the center pillar 35 as most parts thereof are illustrated in FIG. 2 with dotted lines. As illustrated in FIG. 2, FIG. 4, and FIG. 5, in upper end front portions of the latch reinforcement 43 and the door inner panel 32, a cutout portion 44 is formed so as to be continuous with both of the latch reinforcement 43 and the door inner panel 32.

As illustrated in FIG. 2, FIG. 4, and FIG. 5, in an upper end front portion of the center pillar 35, a cutout portion 45 of which cutout range is larger than that of the cutout portion 44 is formed. The cutout portion 45 is a cutout portion for mounting a die molding sealing member 46 (see FIG. 5) that performs corner sealing with the front door 10.

Even when the cutout portion 45 as above is formed, a case where the upper end front portion of the center pillar 35 slips through the cutout portion 45 to the indoor direction is suppressed by suppressing the abovementioned behavior of the center pillar 35 by the gusset member 41.

As illustrated in FIG. 1 to FIG. 5, the door inner panel 32 has a panel body 32a, a plurality of openings 32b, 32c, and 32d are formed in the panel body 32a, and an opening 47 for mounting side window glass is formed in the window frame portion 30S.

Figure 7:
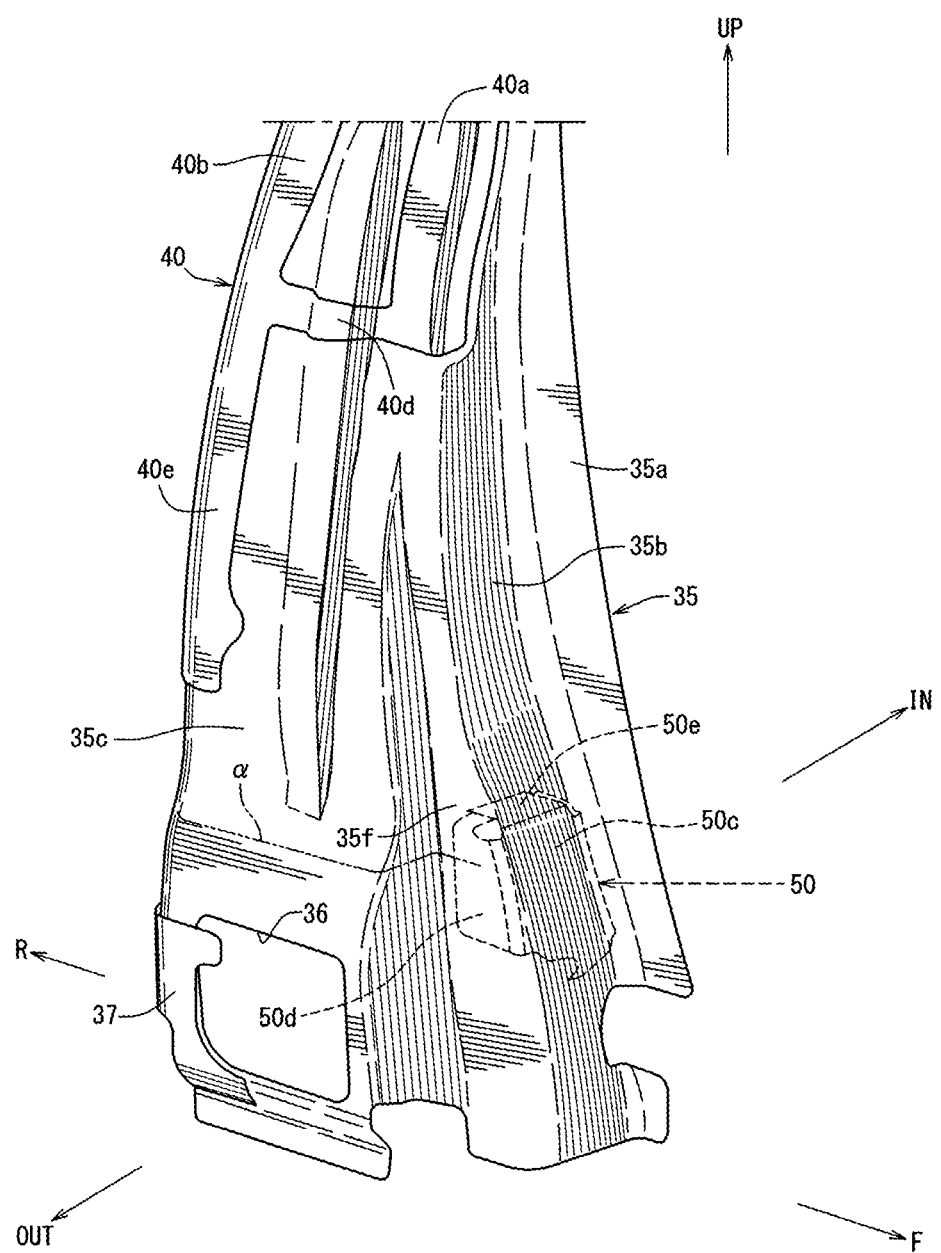
FIG. 7 is a perspective view of a center pillar.
Figure 8:
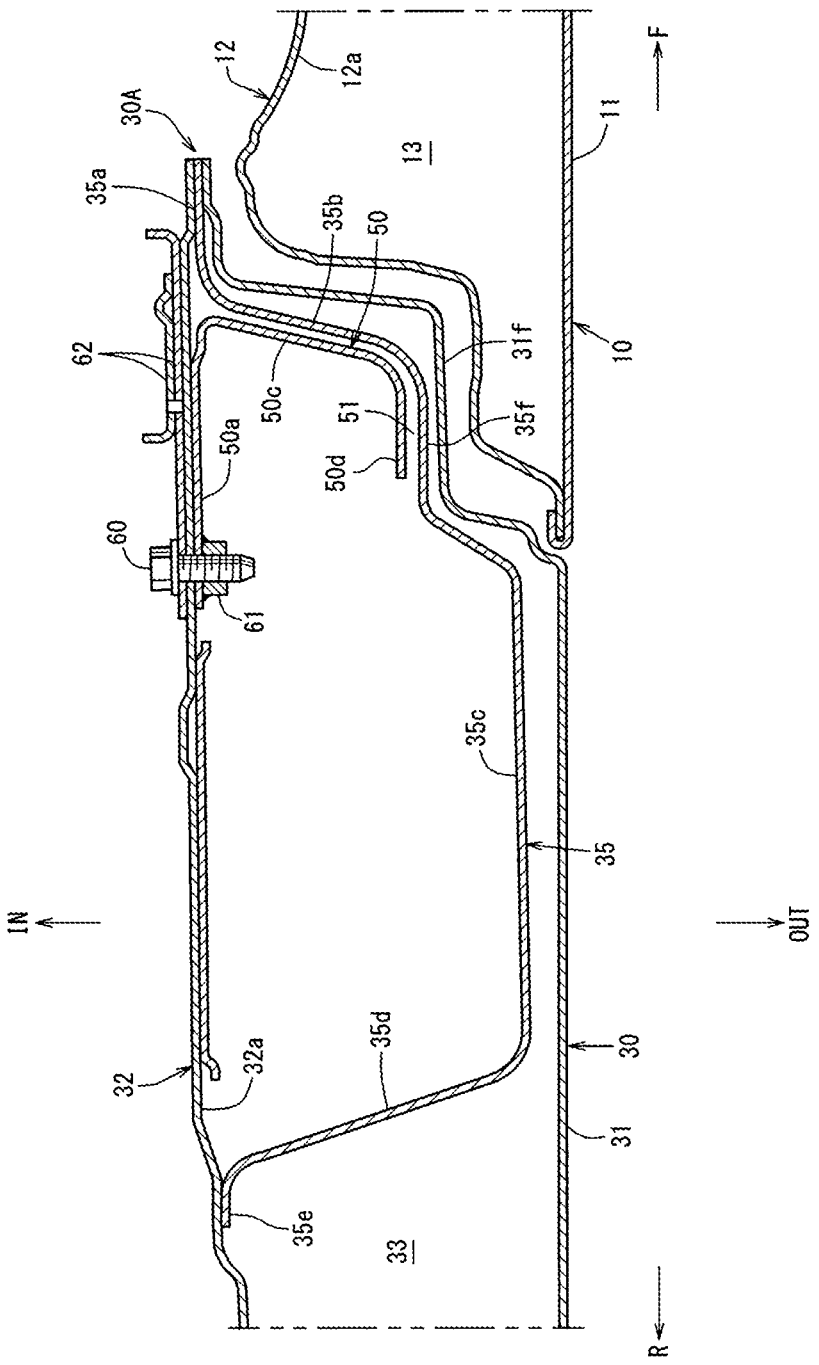
FIG. 8 is a cross-sectional arrow view of a main part taken along line B-B in FIG. 2.
Figure 9:
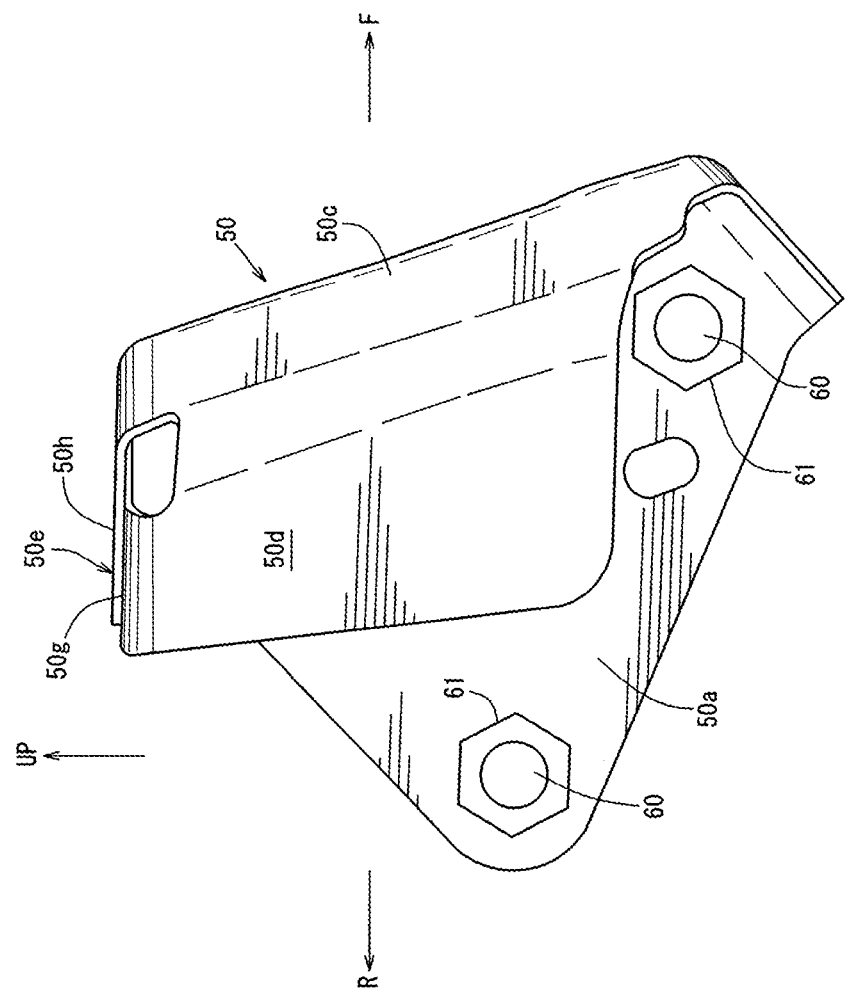
FIG. 9 is a side view of an energy absorbing material.
Figure 10:
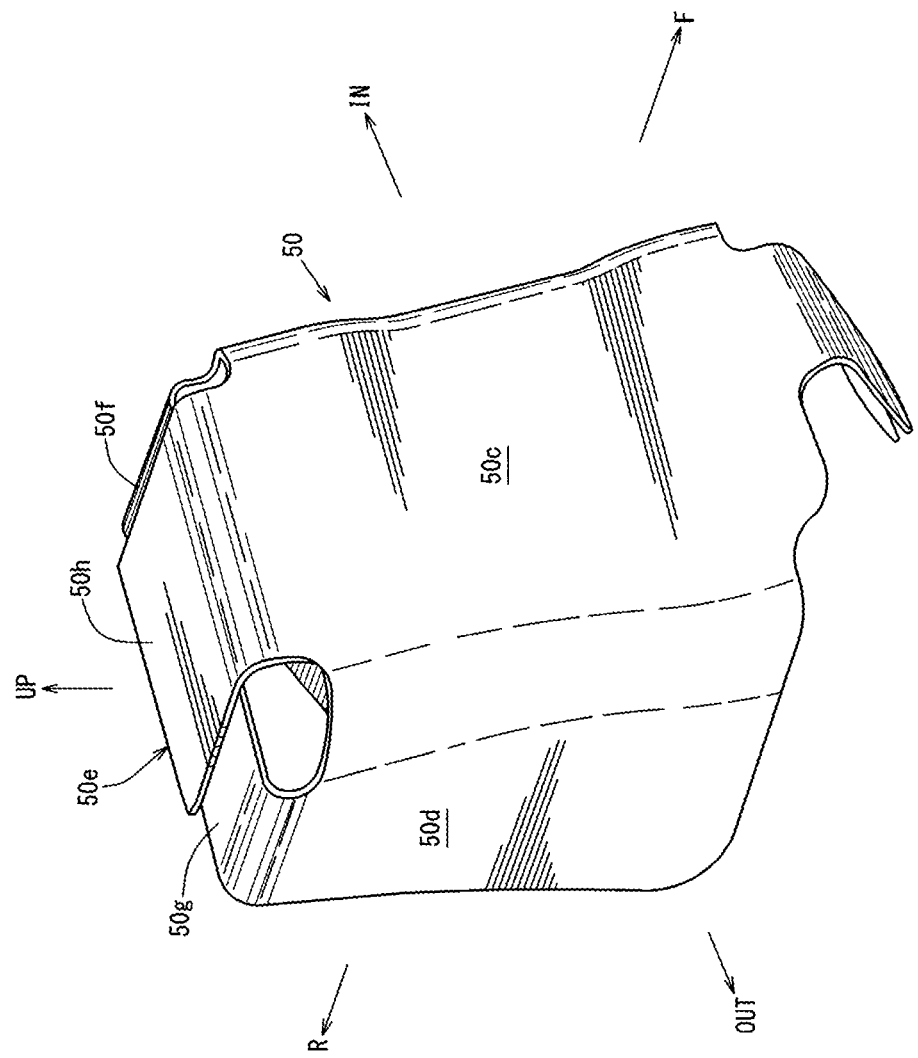
FIG. 10 is a perspective view illustrating the energy absorbing material in a state seen from the vehicle-width-direction outer side and the upper front direction and FIG. 11 is a perspective view illustrating the energy absorbing material in a state seen from the vehicle-width-direction inner side and the upper rear direction.
Figure 11:
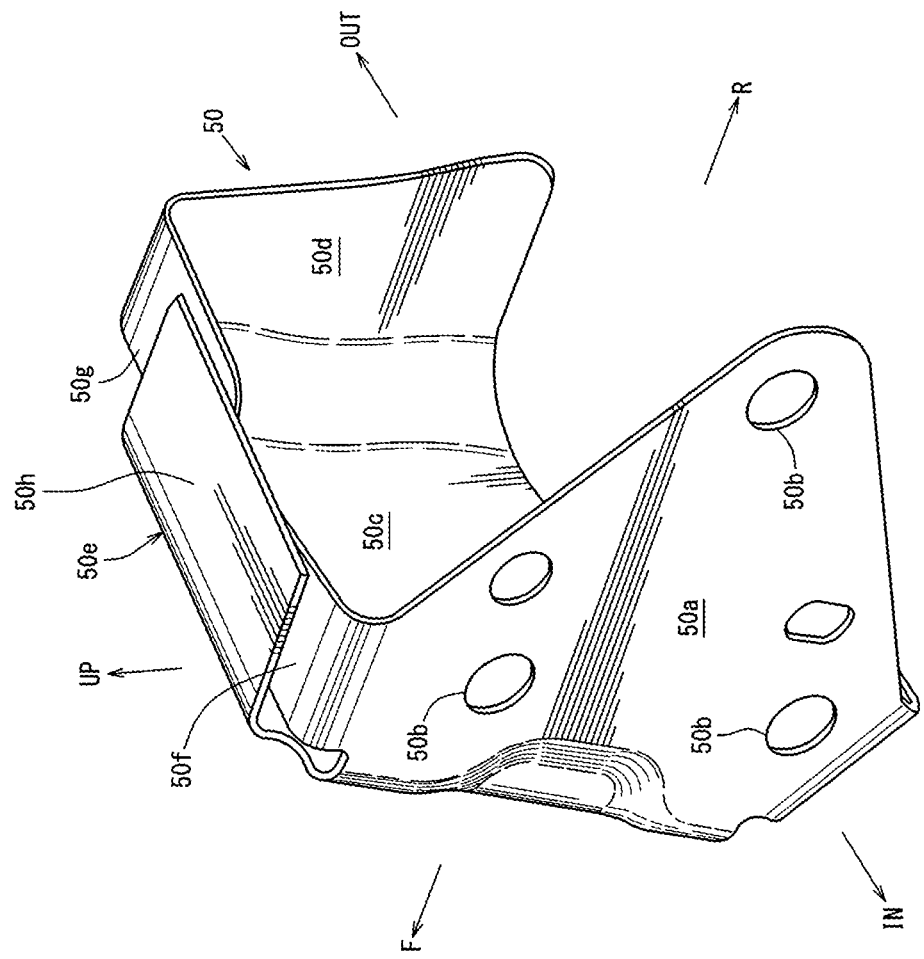

FIG. 7 is a perspective view of the center pillar, FIG. 8 is a cross-sectional arrow view of a main part taken along line B-B in FIG. 2, FIG. 9 is a side view of an energy absorbing material, FIG. 10 is a perspective view illustrating the energy absorbing material in a state seen from the vehicle-width-direction outer side and the upper front direction, and FIG. 11 is a perspective view illustrating the energy absorbing material in a state seen from the vehicle-width-direction inner side and the upper rear direction.

As illustrated in FIG. 7, the center pillar 35 is formed such that the lower end side is positioned on the vehicle-width-direction outer side with respect to an upper end thereof. In other words, the center pillar 35 is formed such that the width of the lower end side in the vehicle width direction is wider than the width of the upper end in the vehicle width direction. As illustrated in FIG. 2 and FIG. 7, in the center pillar 35, the opening 36 is provided to be close to the lower portion of the outer wall portion 35c serving as an outer wall thereof, and the opening 36 is set in a breakage inducing portion that induces breakage at the time of a vehicle side collision.

As illustrated in FIG. 7 and FIG. 8, a step-down portion 35f recessed to the vehicle-width-direction inner side is formed in a corner portion between a vehicle-width-direction outer portion of the front wall portion 35b and a front portion of the outer wall portion 35c of the center pillar 35 of the opening 36 forming the breakage inducing portion. In other words, the step-down portion 35f is formed in the corner portion on the front side in a position closer to the lower portion of the center pillar 35, and a step-down portion 31f is similarly formed in the door outer panel 31 so as to correspond to the step-down portion 35f (see FIG. 8).

As illustrated in FIG. 8, a rear end portion of the front door 10 overlaps with the outer side of the step-down portions 31f and 35f of the door outer panel 31 and the center pillar 35 from the vehicle-width-direction outer side. As a result, when both of the doors 10 and 30 are closed, the front door 10 to the rear door 30 are caused to be flush. As illustrated in FIG. 2, FIG. 7, and FIG. 8, an energy absorbing material 50 is disposed between the step-down portion 35f of the center pillar 35 and a lower front portion of the door inner panel 32 of the rear door 30.

As illustrated in FIG. 8, by disposing the energy absorbing material 50 on the stepped-down corner portion of the center pillar 35, the energy absorbing material 50 is downsized and the side collision energy is efficiently absorbed.

As illustrated in FIG. 8, a seat belt anchor 62 that is a vehicle part is mounted on a place in the door inner panel 32 between the front and rear joining flange portions 35a and 35e of the center pillar 35 with use of a bolt 60 and a nut 61 (in detail, a weld nut). The seat belt anchor 62 is mounted on a vehicle-width-direction inner surface of the door inner panel 32.

On a vehicle-width-direction outer surface of the door inner panel 32 on which the seat belt anchor 62 is mounted, an anchor reinforcement 50a serving as a reinforcement member is provided by also using the bolt 60 and the nut 61. In other words, the anchor reinforcement 50a is provided on a portion on which the seat belt anchor 62 is mounted so as to face the seat belt anchor 62 via the door inner panel 32. The energy absorbing material 50 is integrally formed with the anchor reinforcement 50a that is a reinforcement member so as to extend toward the vehicle outer side.

In FIG. 8, only one set of the bolt 60 and the nut 61 that fastens and fixes the anchor reinforcement 50a is illustrated. However, specifically, as illustrated in FIG. 11, the anchor reinforcement 50a is fixed by a plurality of the bolts 60 inserted through a plurality of bolt insertion holes 50b and a plurality of the nuts 61.

As described above, by integrally forming the energy absorbing material 50 extending toward the vehicle outer side with the anchor reinforcement 50a, the anchor reinforcement 50a also serves as the energy absorbing material 50, and both of the number of parts and the assembling time are reduced.

As illustrated in FIG. 8 to FIG. 11, the energy absorbing material 50 is formed in a box-like shape. As a result, at the time of a side collision, the absorption amount of the side collision energy by the energy absorbing material 50 is improved. The energy absorbing material 50 is formed as illustrated in FIG. 8 to FIG. 11, in detail.

In other words, the energy absorbing material 50 is formed in a half-box-like shape including a front wall portion 50c along the front wall portion 35b of the center pillar 35 corresponding to a front end of the rear door 30, a side wall portion 50d along the step-down portion 35f, and an upper wall portion 50e connecting an upper end of the front wall portion 50c and an upper end of the side wall portion 50d to each other.

As illustrated in FIG. 8 to FIG. 11, the energy absorbing material 50 is formed in a half-box-like shape of which vehicle lower side and vehicle rear side are opened. As illustrated in FIG. 8, a clearance 51 is formed between the side wall portion 50d of the energy absorbing material 50 and the step-down portion 35f of the center pillar 35.

As illustrated in FIG. 10 and FIG. 11, the upper wall portion 50e is formed by an outward bending portion 50f obtained by bending an upper end of the anchor reinforcement 50a to the vehicle outer side, an inward bending portion 50g obtained by bending the upper end of the side wall portion 50d to the vehicle inner side, and a rearward bending portion 50h obtained by bending the upper end of the front wall portion 50c to the vehicle rear side.

When the energy absorbing material 50 is formed by the anchor reinforcement 50a, the wall portions 50c and 50d, and the bending portions 50f, 50g, and 50h, the energy absorbing material 50 can be easily formed by press working from a plate member expanded to have a flat plate-like shape.

As described above, the energy absorbing material 50 includes the upper wall portion 50e and the front wall portion 50c to which a side collision load is easily input. As a result, the efficiency of the side collision energy absorption is improved. In this embodiment, as illustrated in FIG. 8, the front wall portion 50c and the side wall portion 50d of the energy absorbing material 50 are formed so as to be substantially parallel to the front wall portion 35b and the step-down portion 35f of the center pillar 35. In the drawings, arrow F indicates the vehicle front side, arrow R indicates the vehicle rear side, arrow IN indicates the vehicle-width-direction inner side, arrow OUT indicates the vehicle-width-direction outer side, and arrow UP indicates the vehicle upper side.

In the side vehicle-body structure of the vehicle formed as described above, the lower portion side of the center pillar 35 is temporarily broken, to thereby cause the center pillar 35 to be vertical at the time of a side collision. In this case, the opening 36 serving as the breakage inducing portion is formed in the outer wall portion 35c of the center pillar 35, and hence an up-down-direction intermediate position between a lower end of the downward extending portion 40e in the reinforcement member 40 and an upper rim of the opening 36 indicated by a virtual line a in FIG. 7 breaks to the vehicle-width-direction inner side.

The energy absorbing material 50 is provided in a position corresponding to the virtual line α, and the step-down portion 35f of the center pillar 35 absorbs the side collision energy from the start of the side collision at which breakage deformation to the vehicle-width-direction inner side occurs. The energy absorbing material 50 is formed in a half-box-like shape including the upper wall portion 50e and the front wall portion 50c to which the side collision load is easily input, and hence both of the improvement of the efficiency of the side collision energy absorption and the improvement of the absorption amount of the side collision energy can be obtained.

As described above, the side vehicle-body structure of the vehicle of the abovementioned embodiment includes the center pillar 35 in which the lower end side is positioned on the vehicle-width-direction outer side with respect to the upper end thereof, the center pillar 35 includes the breakage inducing portion (opening 36) that is provided to be close to the lower portion of the outer wall (outer wall portion 35c) of the center pillar 35 and induces breakage at the time of a side collision, and the step-down portion 35f provided in the corner portion of the outer wall of the center pillar 35 of the breakage inducing portion (opening 36), and the energy absorbing material 50 is disposed between the step-down portion 35f and the door inner panel 32 (see FIG. 7 and FIG. 8).

According to this configuration, by disposing the energy absorbing material 50 on the stepped-down corner portion of the center pillar 35, the energy absorbing material 50 can be downsized and the side collision energy can be efficiently absorbed.

When the side collision load is input to the step-down portion 35*f* in the corner portion of the outer wall of the center pillar 35, the side collision load can be immediately transmitted to the energy absorbing material 50 and the energy can be absorbed without a time lag.

In one embodiment of the present disclosure, a vehicle part (seat belt anchor 62) is mounted on the center pillar 35 and the reinforcement member (anchor reinforcement 50*a*) is provided on the portion of the center pillar 35 on which the vehicle part is mounted, and the energy absorbing material 50 extending toward the vehicle outer side is integrally formed with the reinforcement member (anchor reinforcement 50*a*) (see FIG. 8). According to this configuration, the reinforcement member (anchor reinforcement 50*a*) can also serve as the energy absorbing material 50, and hence both of the reduction of the number of parts and the reduction of the assembling time can be performed.

In one embodiment of the present disclosure, the energy absorbing material 50 is formed in a box-like shape (see FIG. 9, FIG. 10, and FIG. 11). According to this configuration, by forming the energy absorbing material 50 in a box-like shape, the absorption amount of the side collision energy can be improved.

In one embodiment of the present disclosure, the vehicle is a clamshell door vehicle including the front door 10 and the rear door 30 in the form of a clamshell door structure, the center pillar 35 is built in the front end portion of the rear door 30, the step-down portion 35*f* is formed in the corner portion of the front side of the center pillar 35, and the rear end portion of the front door 10 overlaps with the outer side of the step-down portion 35*f* (see FIG. 1 and FIG. 8).

According to this configuration, the following effect is obtained. In other words, in the doors in the form of a clamshell door structure, the step-down portions 31*f* and 35*f* are formed in the front end of the rear door 30 such that the front door 10 and the rear door 30 are flush when both of the doors 10 and 30 are closed in a manner in which the rear end portion of the front door 10 overlaps with the front end portion of the rear door 30. The energy absorbing material 50 can be compactly disposed while using the structure as above in which the front door 10 to the rear door 30 are flush when the doors are closed. In other words, the energy absorbing material 50 can be compactly disposed without forming a special door shape.

In one embodiment of the present disclosure, the energy absorbing material 50 is formed in a half-box-like shape including the front wall portion 50*c* along the front end of the rear door 30, the side wall portion 50*d* along the step-down portion 35*f*, and the upper wall portion 50*e* connecting the upper end of the front wall portion 50*c* and the upper end of the side wall portion 50*d* to each other (see FIG. 8 to FIG. 11).

According to this configuration, the energy absorbing material 50 includes the upper wall portion 50*e* and the front wall portion 50*c* to which the side collision load is easily input, and hence the efficiency of the side collision energy absorption can be improved.

Regarding the correspondence between the configuration of the present disclosure and the abovementioned embodiment, the outer wall of the center pillar of the present disclosure corresponds to the outer wall portion 35*c* of the center pillar 35 of the embodiment. Similarly, the breakage inducing portion corresponds to the opening 36, the inner panel corresponds to the door inner panel 32, the vehicle part corresponds to the seat belt anchor 62, and the reinforcement member corresponds to the anchor reinforcement 50*a*. However, the present disclosure is not limited to the configuration of the abovementioned embodiment.

For example, the side vehicle-body structure of the vehicle including the doors in the form of a clamshell door structure has been exemplified in the abovementioned embodiment, but a vehicle in which the rear door is a slide door is also possible as long as the vehicle is a vehicle in which the center pillar does not exist on the body side.

As described above, the present disclosure is useful for a side vehicle-body structure of a vehicle including a center pillar in which a lower end side is positioned on the vehicle-width-direction outer side with respect to an upper end thereof.

What is claimed is:

1. A side vehicle-body structure of a vehicle, the side vehicle-body structure comprising:
 a center pillar in which a lower end side is positioned on a vehicle-width-direction outer side with respect to an upper end thereof, the center pillar includes:
  a breakage inducing portion that is provided to be close to a lower portion of an outer wall of the center pillar and induces breakage at time of a side collision; and
  a step-down portion provided in a corner portion of a center pillar outer wall of the breakage inducing portion, and
 an energy absorbing material is disposed between the step-down portion and an inner panel.

2. The side vehicle-body structure of the vehicle according to claim 1, wherein
 a vehicle part is mounted on the center pillar and a reinforcement member is provided on a portion of the center pillar on which the vehicle part is mounted, and
 the energy absorbing material extending toward a vehicle outer side is integrally formed with the reinforcement member.

3. The side vehicle-body structure of the vehicle according to claim 2, wherein the energy absorbing material is formed in a box-like shape.

4. The side vehicle-body structure of the vehicle according to claim 3, wherein
 the vehicle is a clamshell door vehicle including a front door and a rear door in a form of a clamshell door structure,
 the center pillar is built in a front end portion of the rear door,
 the step-down portion is formed in the corner portion on a front side of the center pillar, and
 a rear end portion of the front door overlaps with an outer side of the step-down portion.

5. The side vehicle-body structure of the vehicle according to claim 4, wherein
 the energy absorbing material is formed in a half-box-like shape including a front wall portion along a front end of the rear door, a side wall portion along the step-down portion, and an upper wall portion connecting an upper end of the front wall portion and an upper end of the side wall portion to each other.

6. The side vehicle-body structure of the vehicle according to claim 1, wherein
 the vehicle is a clamshell door vehicle including a front door and a rear door in a form of a clamshell door structure,
 the center pillar is built in a front end portion of the rear door, the step-down portion is formed in the corner portion on a front side of the center pillar, and a rear end portion of the front door overlaps with an outer side of the step-down portion.

7. The side vehicle-body structure of the vehicle according to claim 2, wherein the vehicle is a clamshell door vehicle including a front door and a rear door in a form of a clamshell door structure, the center pillar is built in a front end portion of the rear door, the step-down portion is formed in the corner portion on a front side of the center pillar, and a rear end portion of the front door overlaps with an outer side of the step-down portion.

8. The side vehicle-body structure of the vehicle according to claim 6, wherein the energy absorbing material is formed in a half-box-like shape including a front wall portion along a front end of the rear door, a side wall portion along the step-down portion, and an upper wall portion connecting an upper end of the front wall portion and an upper end of the side wall portion to each other.

9. The side vehicle-body structure of the vehicle according to claim 2, wherein the reinforcement member comprises an anchor reinforcement, provided on a portion on which a seat belt anchor is mounted, to face the seat belt anchor via the inner panel.

10. The side vehicle-body structure of the vehicle according to claim 9, wherein the vehicle is a clamshell door vehicle including a front door and a rear door in a form of a clamshell door structure, the center pillar is built in a front end portion of the rear door, the step-down portion is formed in the corner portion on a front side of the center pillar, and a rear end portion of the front door overlaps with an outer side of the step-down portion.

11. The side vehicle-body structure of the vehicle according to claim 10, wherein the energy absorbing material is formed in a half-box-like shape including a front wall portion along a front end of the rear door, a side wall portion along the step-down portion, and an upper wall portion connecting an upper end of the front wall portion and an upper end of the side wall portion to each other.

\* \* \* \* \*